United States Patent
Oldfield (10) Patent No.: US 8,382,985 B1
(45) Date of Patent: Feb. 26, 2013

(54) APPARATUS, SYSTEM AND PROCESS FOR WASTEWATER PURIFICATION

(76) Inventor: Corwyn Oldfield, Visalia, CA (US)

( * ) Notice: Subject to any disclaimer, the term of this patent is extended or adjusted under 35 U.S.C. 154(b) by 0 days.

(21) Appl. No.: 13/437,554

(22) Filed: Apr. 2, 2012

(51) Int. Cl.
*C02F 3/06* (2006.01)
*C02F 3/08* (2006.01)

(52) U.S. Cl. .................... 210/615; 210/619; 210/151

(58) Field of Classification Search .................. 210/615, 210/619, 626, 150, 151, 195.3
See application file for complete search history.

(56) References Cited

U.S. PATENT DOCUMENTS

| | | | | |
|---|---|---|---|---|
| 3,235,234 | A * | 2/1966 | Beaudoin | 210/150 |
| 5,096,579 | A * | 3/1992 | Jordan et al. | 210/150 |
| 6,348,147 | B1 * | 2/2002 | Long | 210/150 |
| 7,402,248 | B2 * | 7/2008 | Cuenca et al. | 210/619 |
| 7,452,469 | B1 * | 11/2008 | Kim | 210/619 |
| 7,465,394 | B2 * | 12/2008 | Durda et al. | 210/615 |
| 7,520,980 | B2 * | 4/2009 | Monosov et al. | 210/150 |
| 7,820,048 | B2 * | 10/2010 | Weissman | 210/619 |
| 2005/0269262 | A1 * | 12/2005 | McBride | 210/615 |

* cited by examiner

*Primary Examiner* — Christopher Upton
(74) *Attorney, Agent, or Firm* — Maier & Maier, PLLC (57) ABSTRACT

An apparatus, system, and process for wastewater treatment. The apparatus can include a basin for receiving a liquid to be treated, the liquid having a direction of flow, and a plurality of pendant sheets for supporting the growth of microorganisms, disposed within the basin and in contact with the liquid, wherein the pendant sheets are oriented parallel to the direction of flow of the liquid.

19 Claims, 9 Drawing Sheets

APPARATUS, SYSTEM AND PROCESS FOR WASTEWATER PURIFICATION

BACKGROUND

Wastewater treatment systems are commonly used for purification of wastewater, sewage and the like, and allow for the return of the treated wastewater to the environment. However, it can be desirable to increase the efficiency and level of purification while decreasing the usage of chemical reagents as well as outside energy inputs.

SUMMARY

According to at least one exemplary embodiment, an apparatus for wastewater treatment may be disclosed. The apparatus can include a basin for receiving a liquid to be treated, the liquid having a direction of flow, and a plurality of pendant sheets for supporting the growth of microorganisms, disposed within the basin and in contact with the liquid wherein the pendant sheets are oriented parallel to the direction of flow of the liquid. The plurality of pendant sheets can further include a radicalized resin fiber network media and a thixed, prepromoted unsaturated wax orthopolyester resin coating.

According to another exemplary embodiment, a system for wastewater treatment may be disclosed. The system can include at least one rotating biological processor and at least one pendant biological processor disposed downstream of the at least one rotating biological processor, wherein the at least one pendant biological processor further includes a basin for receiving wastewater, the wastewater having a direction of flow, and a plurality of pendant sheets for supporting the growth of microorganisms, disposed within the basin and in contact with the wastewater, the pendant sheets being oriented parallel to the direction of flow of the wastewater.

According to another exemplary embodiment, a process for wastewater treatment may be disclosed. The process can include flowing wastewater into a basin, the basin having a plurality of pendant sheets suspended therein, flowing the wastewater in a direction parallel to the plurality of pendant sheets, and flowing the wastewater out of the basin, wherein the pendant sheets support the growth of microorganisms for treating the wastewater.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Embodiments disclosed herein present an advanced technique for decomposing sewage and wastewater organic matters and removing suspended solids utilizing a synergetic process of microorganisms, a specialized host medium and supplemental air injection. The embodiments disclosed herein may be adapted for specific applications based on known formulas that take into account the parameters of the desired application. Such parameters may include, for example, pumping capacity, tank and basin capacity, loading rates, hydraulic residence time, mean cell residence time, air volume, overflow rates, and so forth.

Furthermore, the advanced materials and specialized techniques utilized by the embodiments disclosed herein can provide for higher quality discharge effluent, simpler operational aspects and lower operational costs. More specifically, the embodiments disclosed herein may utilize various species of naturally occurring microorganisms in various controlled growing postures. The embodiments disclosed herein may incorporate a series type flow configuration whereby the sewage, wastewater or the like may undergo progressive degrees of purification by adsorption, absorption, and assimilation. This purification and contamination reduction can be facilitated by maintaining desired parameters of food to microorganism (F/M) ratio, mixed liquor suspended solids (MLSS), dissolved oxygen (DO) levels, and pH levels particularly.

The embodiments disclosed herein can include two interconnected specialized process units, each of which may be provided in any desired quantity for the particular application of the system. The specialized process units include a Rotating Biological Processor (RBP) and a Biological Pendant Processor (BPP). The RBP may be utilized as a first stage biological processor tank, while the BPP may be utilized as a second stage biological treatment tank.

Figure 1A:
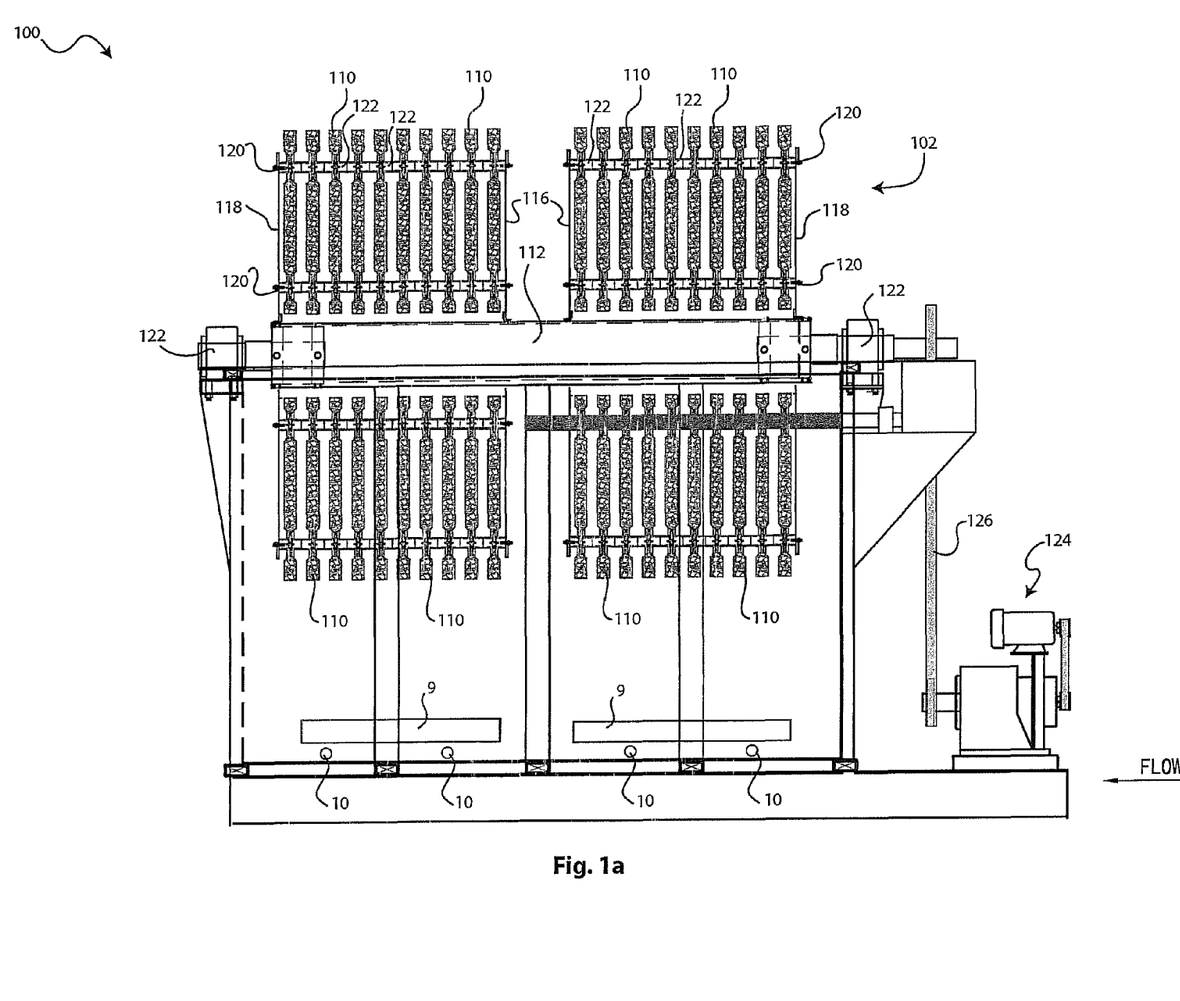
FIG. 1a is a schematic cross-sectional view of an exemplary embodiment of a rotating biological processor.
Figure 1B:
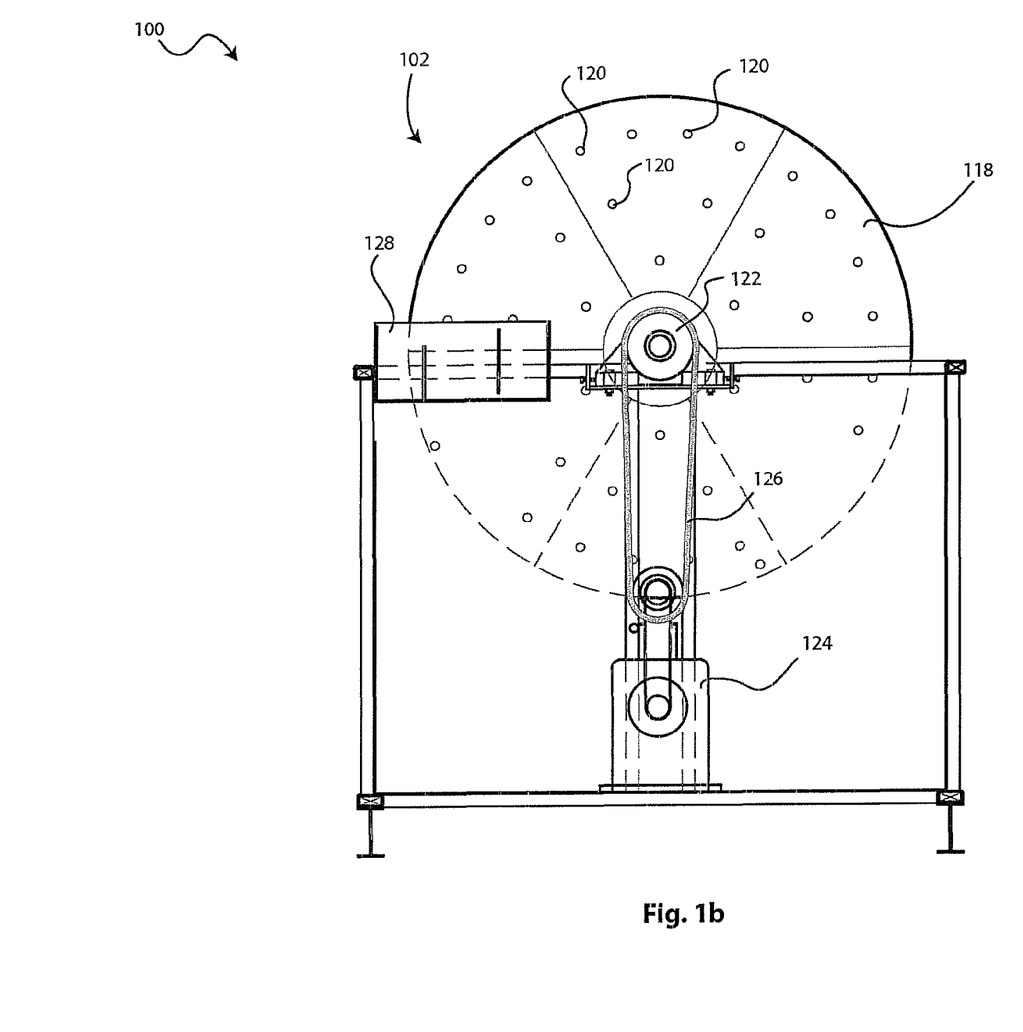
FIG. 1b is a schematic side view of an exemplary embodiment of a rotating biological processor.

Turning to FIGS. 1a-1b, a rotating biological processor 100 may include a rotating biological processor contactor assembly 102. The rotating biological processor contactor assembly 102 can provide a first stage host medium, and include a plurality of media disks 110, which may be provided in desired types, forms and sizes, and mounted in parallel fashion in a spaced formation along a horizontal rotatable drive shaft 112. In some exemplary embodiments, the rotating biological processor contactor assembly 102 can include any desired amount of disks 110, for example between about 10 disks and about 30 disks, or any other desired number of disks that enables the RBP to function as described herein. Exemplary RBP configurations may include 15, 20, 24, or 30 disks; however, any number of disks may be contemplated and provided as desired.

The disks 110 may include a radicalized resin fiber network media, which may be constructed from a material such as Saran®, manufactured by Asahi-Dow, a polyvinylidene monofilament material, or any similar material that enables the RBP to function as described herein. The radicalized resin fiber network media may further include a thixed, prepromoted unsaturated wax orthopolyester resin, for example Eterset 2597 APTC-M2, or any similar material that enables the RBP to function as described herein. The resin may be applied to the fiber network media by any known manner, for example spray coating. The resin may serve to increase the homogeneity of the stranded network media, strengthen the mechanical resilience of the irregularly entangled radicalized media and further provide an added protective layer. In some embodiments, the network media may be cut and tailored into six substantially equally shaped pieces. The pieces, when fitted to the carrying structure included herein, can be shaped as a circular media disk. The coated resin fiber network media used herein may be about 40-60 mm in thickness, for example about 50 mm, may have a linear mass density of about 3500-4500 denier, for example 4000 denier, and may have a void ratio of above approximately 95.0%, for example 97.0% and above.

Furthermore, the resin fiber entangled network media disk can allow the contaminated effluent containing organic matter, suspended solids, and the like to easily flow up, down, back and forth through the reticular mesh when the disk is rotating. Along with the wastewater, this can provide for the introduction of ambient air in, around and throughout the entangled stranded media disk, where an evolving thin coat of microorganisms can be sustained on the individual resin strands. The microorganisms that are used to seed the media disks can be desired naturally occurring Bacillus species bacteria, various rotifers, protozoa and metazoa.

The carrying structure of the RBP 100 can include the main carrier shaft 112, shaft ends 114, and middle and end support frames 116, 118 coupled to the main carrier shaft 112. The support frames 116, 118 can include multiple horizontal rod stock 120 having threaded ends for supporting the circular resin fiber network media disks 110. The carrying structure of the RBP 100 may be constructed of stainless steel materials, or any other suitable material for the application. The fiber network media disks 110 may be separated by attendant hollow end-flanged spacers 122 of requisite sizing which can slide onto the support rod stock 120 between the media disks 110, the support rod stock 120 being coupled to the middle and end support frames 116, 118 on the main carrier shaft 112 with washers, nuts, or any other suitable coupling. In some exemplary embodiments, RBP units having less than 20 disks, for example 15 disks, may include two end support frames 118, with media disks 110 mounted between the end support frames 118, separated by spacers 122. In other exemplary embodiments, RBP units having 20 or more disks, for example 20, 24, or 30 disks, may include end support frames 118 mounted at the ends of the main carrier shaft 112, and may include a center support frame 116 mounted proximate the center of the main carrier shaft 112. Media disks 110 may be mounted between each end support frame 118 and the center support frame 116, and may be separated by spacers 122, substantially as shown in FIG. 1a.

The main carrier shaft 112 and other components of the RBP assembly are mounted in commensurately sized carrier bearings 122, the quantity, sizes, and loading rates of which may be determined for a particular wastewater treatment project via the appropriate calculations. The carrier shaft 112 may be provided with a 60% overload safety factor to support the media disks 110 and other components. The carrier bearings 122 may be provided based on the combined load weight of the carrier shaft 112 and the components supported thereon.

The carrier shaft 112 may be coupled to a variable frequency drive motor and may be adapted to operate at any desired rotational speed, for example within a range of about 1 to 6 rpm, depending on the dissolved oxygen level, wastewater load rate and other variables of the particular application. Carrier shaft 112 may be coupled to motor 124 by an endless belt 126, or by any other suitable drive coupling. The tank or basin of the RBP 100 may be formed from any suitable materials, and may be disposed either above ground, partially above ground or in situ. The tank or basin may function as the containment unit for the sewage or wastewater influent being treated, and may be sized according to the particular project design calculations.

The RBP 100 may be mounted such that about 40% of the circular shaped resin fiber network media disks are immersed in the wastewater, thereby soaking that portion of the resin fiber network media with raw effluent as it rotates through the unit. This allows for the wastewater to be engaged by the microorganisms which are attached to the resin fiber network media, thereby resulting in contaminant reduction and purification. A water volume adjuster 128 may be provided within RBP 100 so as to maintain a desired water level in the tank or basin.

Figure 2A:
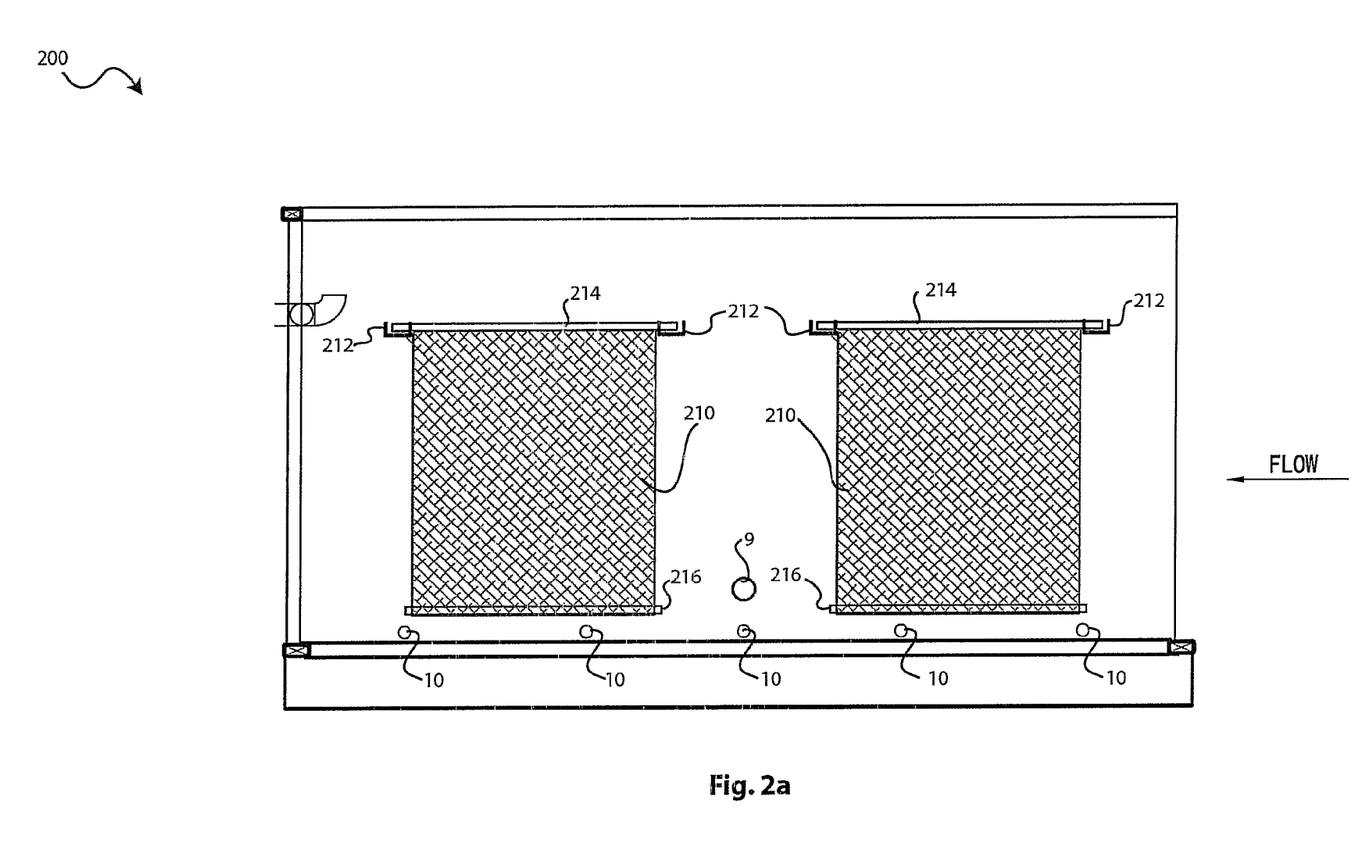
FIG. 2a is a schematic side view of an exemplary embodiment of a pendant biological processor.
Figure 2B:
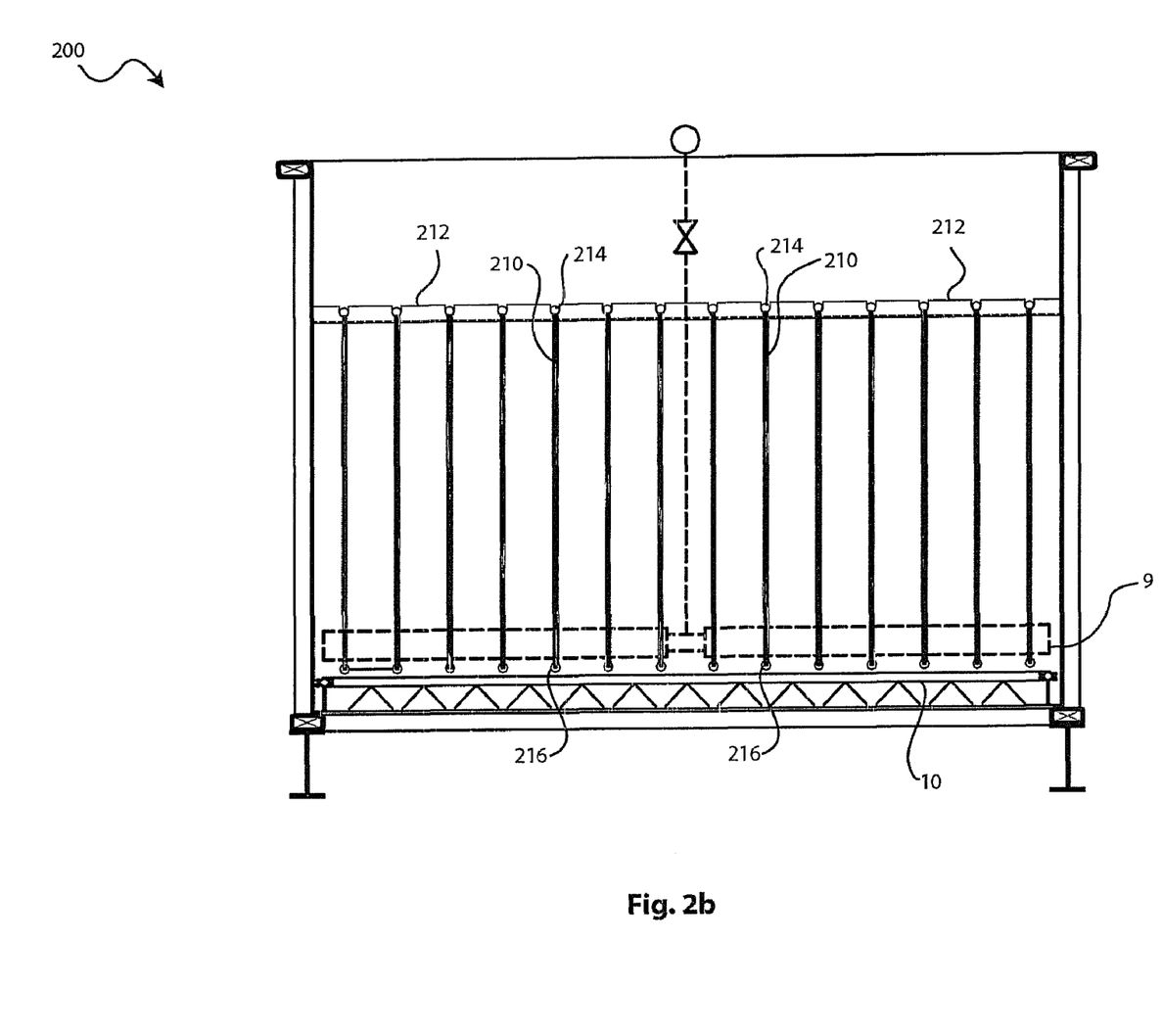
FIG. 2b is a schematic cross-sectional view of an exemplary embodiment of a pendant biological processor.

Turning to FIG. 2, the Biological Pendant Processor 200 may be downstream of the RBP 100 and receive the effluent therefrom. The BPP 200 can include a tank or basin constructed of any suitable materials, and may further include a plurality of sheet-like pendants 210. The quantity, sizes and loading rates of the pendants 210 may be for a particular wastewater treatment project via the appropriate calculations, and further in accordance with and incidental to the accomplished level of treatment in the upstream RBP 100. The sheet-like pendants 210 may be arranged and suspended in parallel fashion as well in a spaced formation. The thinnest dimension of the pendants 210 when suspended may be oriented such that the flow direction of the effluent is substantially parallel to the planes of pendants 210. The sheet-like pendants may be constructed from a material such as Saran®, manufactured by Asahi-Dow, a polyvinylidene monofilament material, or any similar material that enables the BPP to function as described herein. The radicalized resin fiber network media may further include a thixed, prepromoted unsaturated wax orthopolyester resin coating, for example, Eterset 2597 APTC-M2, or any similar material that enables the BPP to function as described herein. The resin may be applied to the fiber network media by any known manner, for example, spray coating. The resin may serve to increase the homogeneity of the stranded network media, strengthen the mechanical resilience of the irregularly entangled radicalized media and further provide an added protective layer. The fiber network media may optimally be cut and tailored into singular equally sized pendants adapted for a particular project application.

The sheet-like pendants 210 can allow a substantially unrestricted flow of the treatable influent in, around and through each pendant, in part due to the void ratio and stranded construction of the resin fiber network. The void ratio of the entangled media may be above approximately 95.0%, for example 97.0% and above. Each sheet-like pendant may be suspended from a support 212, which may be constructed from stainless steel or any other appropriate material, and may be appropriately engineered for the particular project application.

The sheet-like pendants 210 can provide a surface for supporting the growth of microorganisms, thereby facilitating the microorganisms to decompose and purify residual contaminants and pollutants contained in the sewage and wastewater. The microorganisms that are used to seed pendant media 210 may be, for example, desired naturally occurring Bacillus species bacteria, various rotifers, protozoa and metazoa. Known nutrient activators appropriate for the particular treatment application may be utilized to stimulate growth of microorganisms during initial treatment process startup.

The coated resin fiber network media utilized for the pendants 210 may be about 20-30 mm in thickness, for example 25 mm. The coated resin fiber network media may further have a linear mass density of about 500-1500 denier, for example 900 denier, and may be cut to width and length as appropriate for the particular application. The custom cut piece of resin fiber network media can then be fitted with end pieces. The end pieces may be formed from a material such as nylon and then cut and seamed down the sides thereof.

The width of the end pieces can be substantially similar to the width of the pendant media. Subsequently, the nylon material may be cut into lengths of approximately 10 inches, and folded over each end of the pendant media, such that an approximately 2.5-3 inch loop of material remains beyond the cut end of the pendant media. Subsequently, 2 rows of double nylon stitching, approximately 1 inch apart, may be sewn through the end piece and the resin fiber media such that the fiber media is sandwiched between the two longitudinal edges of the end piece. The loop of excess material can facilitate hanging the pendant from the support. The pendant media can then be suspended by inserting an appropriately sized stainless steel length of pipe 214, which may be approximately 0.75 inches in diameter, through the end piece loop on the pendant and subsequently inserting the pipe into the support frame 212.

The support frame 212 can include a plurality of equally spaced notches sized to receive portions of the pipe 214 so as to maintain the pipe 214 suspended at a height that facilitates suspending the pendant media 210 from the pipe 214. A stainless steel rod 216 having a diameter of approximately 1 inch and a length substantially equal to the width of the pendant, can then be inserted through the bottom loop on the pendant 210. The mass of the rod 216 can be sufficient to provide weight to the suspended pendant media so as to hold it in a substantially vertical position while resisting liquid turbulence. Alternatively, any other structure or weight for maintaining the pendant media in a substantially vertical position may be utilized.

Additionally, the BPP 200 can function as a combination subsequent stage biological processor and aeration basin. Utilizing the BPP 200 in conjunction with the RBP 100 can result in an improved level of floc and consequently an improved settleability rate in the sedimentation tank, without the use of any polymer coagulants. Furthermore, the RBP 100 and BPP 200 may be configured to operate in a series configuration, or in a parallel configuration where appropriate. For example in situations where kind and degree of contaminants needing treatment becomes substantially higher, the parallel configuration may be used. The parallel configuration may be as follows: the influent can be split and deployed to a plurality of RBPs 100 installed in parallel, with the residual effluent from those units consolidated and directed to a subsequent RBP unit or set of RBP units for further treatment. The effluent from the subsequent unit or units can then be deployed to appropriately sized BPP units 200, which may be installed in parallel, to undergo the additional treatment and purification as described above.

Referring now to FIGS. 1a-2b, both the Rotating Biological Processor 100 and the Biological Pendant Processor 200 units may include fine bubble tubular diffusers 9 disposed therein for inoculating the wastewater with supplemental air. The quantity and size of tubular diffusers 9 may be determined as a result of the calculations performed for a particular wastewater treatment project and the extent of aeration needed therefor. In the RBP 100, the tubular diffusers 9 may be located on and parallel to the sidewall of the basin opposite of the location of wastewater inflow. The tubular diffusers 9 can be oriented perpendicularly to the plurality of media disks. The air bubble diffusers 9 can further be situated such that the mid point of the side of the arc of the tubular diffuser 9 and the mid point of the side of the arc of the circular resin fiber network media are in vertical alignment at those corresponding points, with the highest arc of the diffuser being at least 1.5 feet below the lowest point of the media arc. It should be appreciated that the direction of rotation of the rotating media should be such that as the fine bubbles rise the media rotates downward into the bubbles. Such a direction of rotation facilitates increased mixing and interaction of the contaminants, supplemental air and microorganisms on the host media.

The Dissolved Oxygen (DO) levels in the RBP unit 100 can be maintained within a range of approximately 1-3 mg/l, or within a narrower range of approximately 1.5-2 mg/l. It should be appreciated that multiple factors may influence the DO level within the RBP unit 100, for example the contaminant level of the influent being treated, the wastewater temperature, the ambient air temperature as the resin fiber network media rotates out of the influent, the speed which the media is rotating and the supplemental air pressure and temperature. It should further be appreciated that such factors may affect the treatment success and process monitoring information.

In the BPP 200 unit the tubular diffusers 9 can perform dual functions, specifically aeration and mixing. Since the BPP 200 can lack a mechanical stirrer, the introduction of air through the diffusers 9 can function as the motivation force to circulate the wastewater. The tubular diffusers 9 may be positioned such that the longitudinal axes thereof are disposed perpendicular to the planes of the resin fiber network media pendants. The diffusers 9 can be mounted between the point of inflow and the media pendants, or, if multiple parallel supports of the media pendants are provided, the diffusers 9 can be mounted between the plurality of supports but not between the furthest supports adjacent to the discharge overflow tube/weir, and the discharge overflow tube/weir itself. The diffusers 9 may be mounted approximately 6-8 inches above the bottom of the basin of the BPP 200. In operation, the air exiting diffusers 9 may cause the movement of the wastewater in random swirling eddies, thereby continuously mixing and moving the wastewater, while simultaneously introducing new air into the BPP 200 and causing the MLSS to make contact with the microorganisms on the host media pendant. The DO levels in the BPP unit 200 can be maintained within a range of approximately 3-5 mg/l, or within a narrower range of approximately 4-4.5 mg/l.

Both the Rotating Biological Processor 100 and the Biological Pendant Processor 200 units may further include subsurface air manifolds 10 disposed within the RBP and BPP containment basins. Manifolds 10 may be sized, constructed and bored according to calculations performed to determine the needs of the particular sewage, wastewater or the like project. Air manifolds 10 may include a plurality of lateral pipes, and each lateral pipe may include a plurality of orifices spaced along the undersides thereof. The orifices may be sized and shaped to emit coarse air bubbles. The orifices may have a diameter of approximately ⅛ inch. The manifold pipes may be mounted such that the bottoms of the pipes are at most 3 inches above the bottom of the containment basin. Airflow to each lateral pipe, or a plurality of lateral pipes, may be controlled by at least one valve, for example a ball valve, and may be controlled manually, electrically or pneumatically, depending on the design of the particular sewage or wastewater project and the degree of automation desired.

The subsurface air manifold system 10 in the RBP units 100 and BPP units 200 may facilitate creating a disruptive force on the settled solids, thereby promoting the resuspension thereof, and facilitating the settled solids to re-contact the resin fiber network media. This can be accomplished by providing pressurized airflow to the lateral pipes at desired intervals and for desired durations. For example, in the RBP units 100, airflow may be provided at a bidaily frequency for a duration of approximately one minute. In the BPP units 200, airflow may be provided at a frequency of approximately once every 4-days, and for a duration of approximately 1-1.5 minutes. The result of such air scouring functionality can be a reduction of wasted sludge in the processor units. Furthermore, the subsurface air manifold system 10 can facilitate cleaning of a processor basin when necessary, for example by substantially disturbing the bottom of the containment basin by increasing the air pressure provided through the manifold 10 and allowing the scouring to proceed during the liquid purging of the processor units. The desired volume and pressure of air may be determined by the calculations for a particular sewage or wastewater treatment project, and may be provided by known blowing units.

Figure 3:
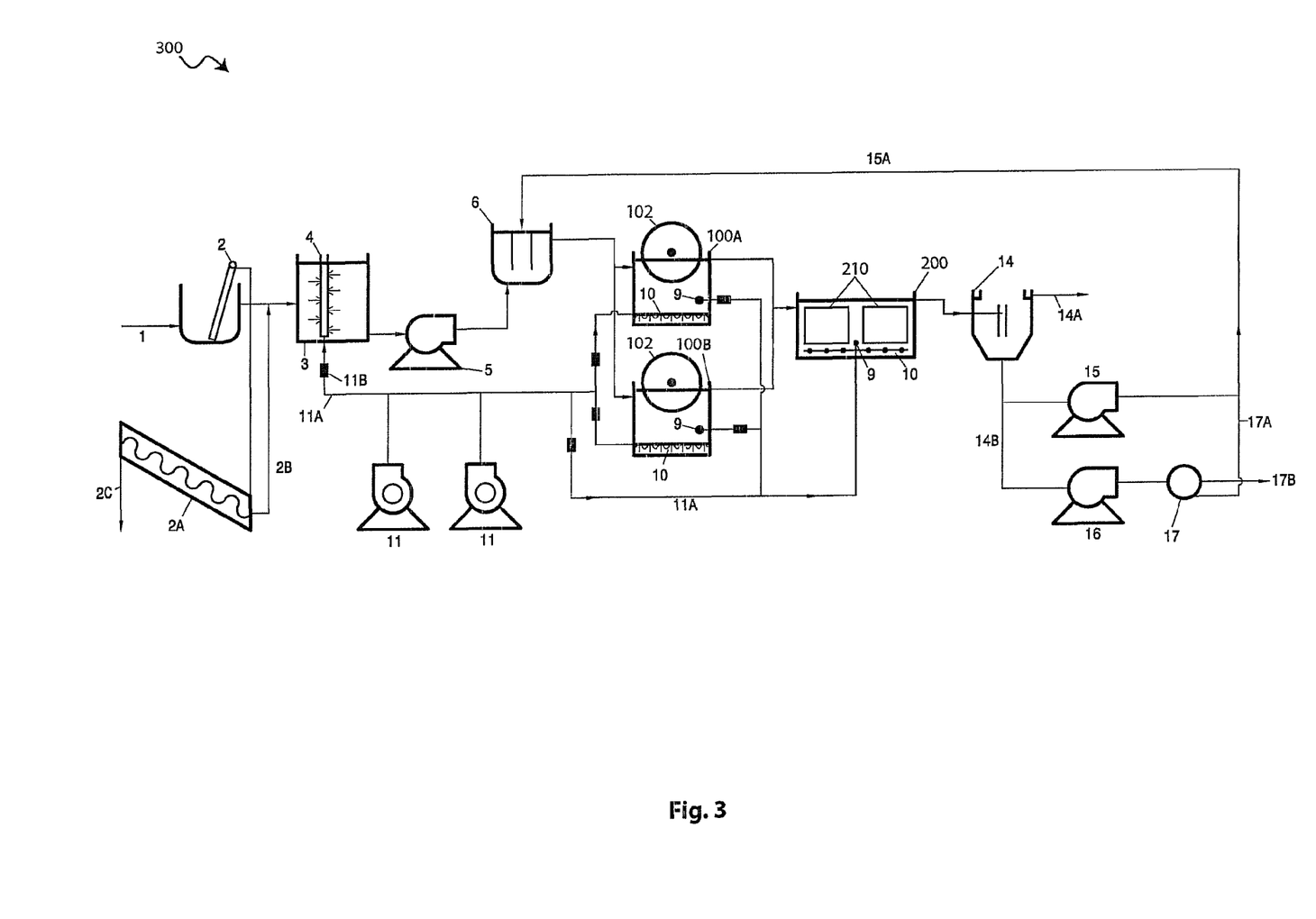
FIG. 3 is a schematic of a first exemplary embodiment of a system for wastewater purification.
Figure 4:
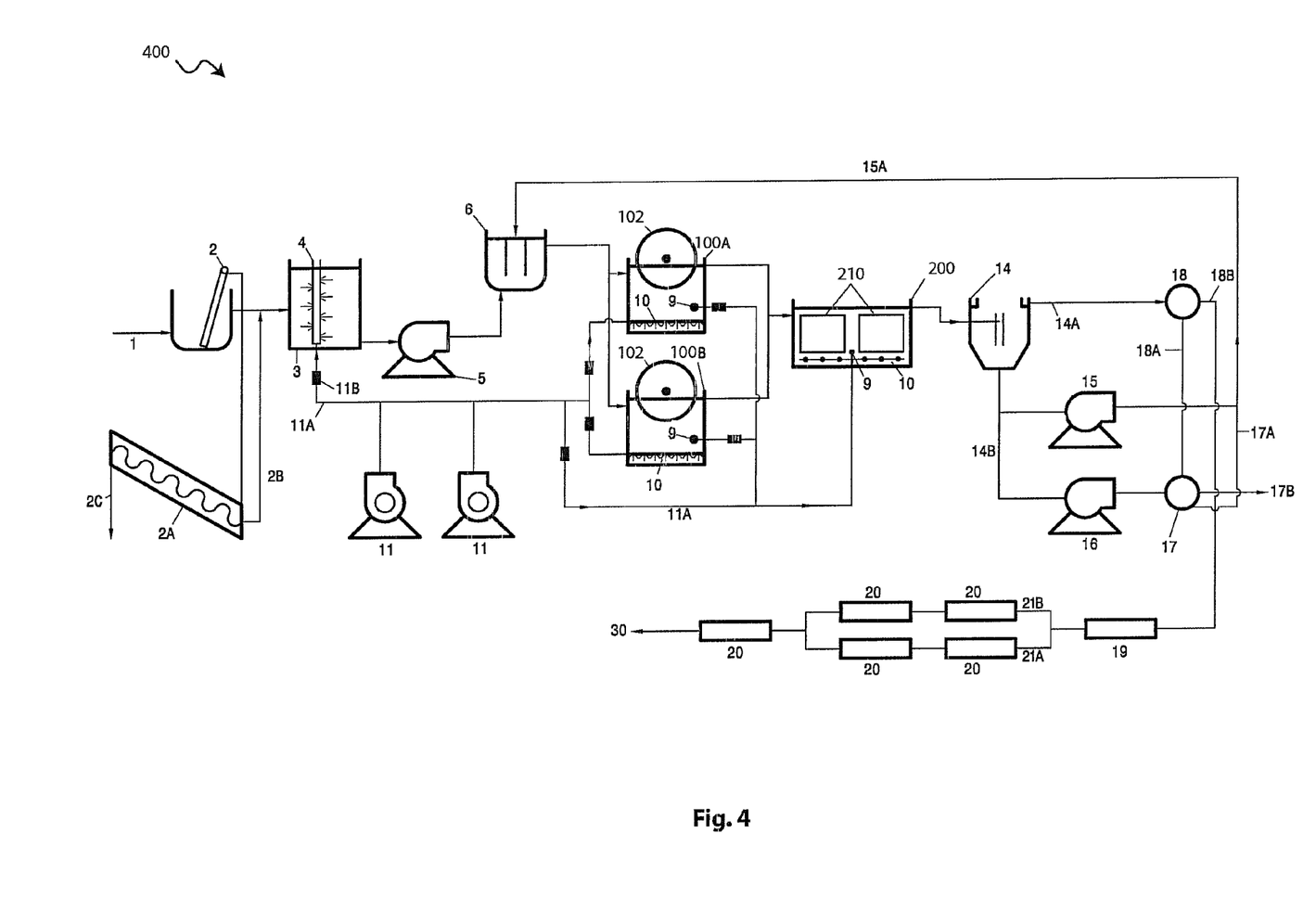
FIG. 4 is a schematic of a second exemplary embodiment of a system for wastewater purification.
Figure 5:
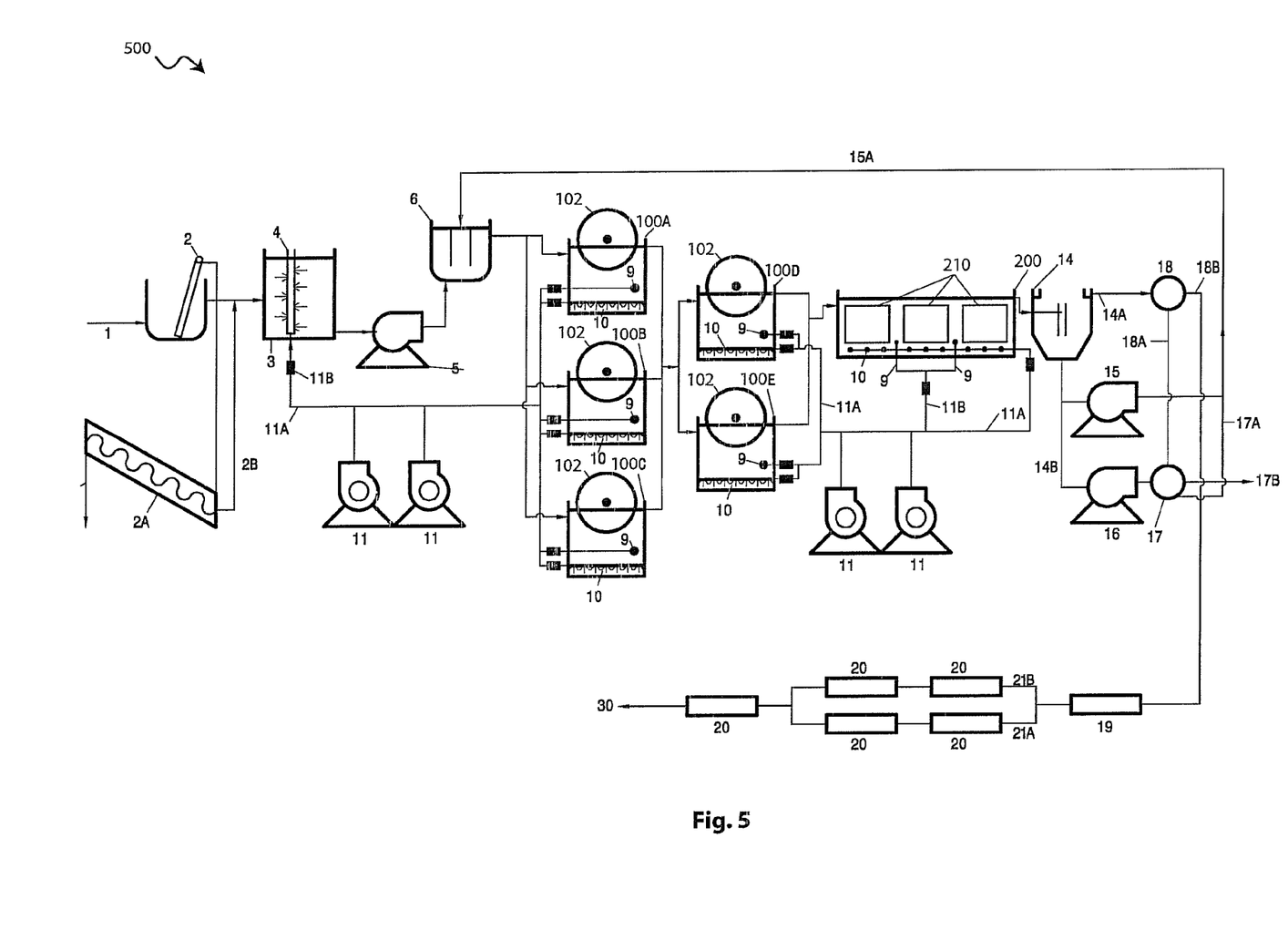
FIG. 5 is a schematic of a third exemplary embodiment of a system for wastewater purification.

Referring generally now to FIGS. 3-5, exemplary embodiments of systems for sewage and wastewater purification treatments may be disclosed. The embodiments of systems disclosed herein can include the RBP 100 and BPP 200 to provide advantageous treatment of sewage and wastewater, as described above. One exemplary embodiment of the system for sewage and wastewater purification treatment may be configured to accomplish decomposition and purification of sewage and wastewater to a quality higher than commonly rated as secondary level. Other exemplary embodiments of the system for sewage and wastewater purification treatment may be configured to accomplish decomposition and purification of sewage and wastewater to a quality commonly rated as tertiary level non-potable.

Turning to FIG. 3, a first exemplary embodiment of a system for sewage and wastewater purification treatment 300 may be disclosed. System 300 can include a general automatic screening device 2 and screening compactor 2a, an equalization basin 3, a flow adjustment tank 6, first stage biological processor tanks, which may be RBP tanks 100a, 100b, with rotary media disk assembly 102, at least one second stage biological processor tank, which may be a BPP tank 200 with stationary pendant media for microbe adherence 210, a sedimentation tank 14, and a sludge dewatering device 17.

The general automatic screening device 2 for removing coarse contaminants can remove suspended solids greater than 5 mm in size from the inflowing sewage and wastewater via an inlet pipe 1. After screening, the effluent can move to equalization basin 3, while the coarse contaminant removed by screening device 2 can be moved to a screening compactor 2a, whereby the captured screenings may be washed and compressed. The decant liquid 2b from screening compactor 2 may be moved to equalization basin 3 while the compacted screenings 2c can be disposed offsite.

The equalization basin 3 is where the influent may be temporarily staged to allow the varying inflow rates to intermix. Such influent blending facilitates increasing the overall wastewater uniformity, quality and treatment efficiency. Equalization basin 3 can include an air distribution pipe 4 and an air supply pipe 11a which may be pressurized by air supplied by at least one blower 11, via an air pressure regulator 11b disposed inline at each installed air supply pipe 11a so as to appropriately regulate the necessary air delivery rate. The appropriate airflow rate per minute and per unit volume can be computed for each specific treatment application. Injecting air into equalization basin 3 can facilitate reducing the likelihood of the stratification of suspended solids which may result in surface caking or solids deposition, as well as reducing the likelihood of putrefaction occurring.

A raw water feed pump 5 may be provided to transfer the influent from equalization tank 3 to flow adjustment tank 6. Flow adjustment tank 6 may be provided to distribute the sewage and wastewater such that the influent flows uniformly into each RBP tank 100a, 100b or similarly to all and any first stage biological processors engaged in the sewage and wastewater treatment process. The appropriate sizes of RBP tanks 100a, 100b may be determined according to computations from known factors for a specific treatment application. Each RBP tank 100a, 100b may include a bottom drain, sludge pump, or access port for cleaning. Each RBP tank 100a, 100b can further include a rotating biological processor contactor assembly 102, which can provide a first stage host medium, and can include a plurality of media disks. In some exemplary embodiments, the rotating biological processor contactor assembly 102 can include any desired amount of disks, for example between 10 disks and 30 disks, which can provide a surface for supporting the growth of microorganisms, and facilitate the microorganisms to decompose and purify contaminants and pollutants contained in the sewage and wastewater that inflows from flow adjustment tank 6. The microorganisms that are used to seed the RBP tank 100a, 100b and more specifically the rotating biological processor contactor assembly 102 can be desired naturally occurring Bacillus species bacteria, various rotifers, protozoa and metazoa. Known nutrient activators appropriate for the particular treatment application may be utilized to stimulate growth of microorganisms during initial treatment process startup.

The RBP tanks 100a, 100b may include fine air bubble tubular diffusers 9 and subsurface air manifold pipes 10. The air devices 9, 10 may be supplied with air generated by at least one blower 11 and may be sized according to computations for a specific treatment application.

The air supplied by at least one blower 11 to fine air bubble tubular diffusers 9 via air regulator 11b and air pipe 11a in the RBP tanks 100a, 100b may have dual functionality. First, the air supplied via diffusers 9 can provide a supplemental air supply to facilitate maintaining appropriate dissolved oxygen levels in RBP tanks 100a, 100b. Furthermore, the air supplied via diffusers 9 can facilitate dislodging and sloughing off excess or old biomass from the biofilm layer on rotating biological processor contactor assembly 102.

Likewise, the air supplied by at least one blower 11 to subsurface air manifold 10 in the RBP tanks 100a, 100b may have dual functionality. First, the air supplied via manifold 10 may facilitate scouring the bottom of the tank. The scouring functionality may be initiated for a desired period of time and at a desired interval, for example, on a bidaily basis to facilitate resuspension of settled solids. Second, the air supplied via manifold 10 can reduce the likelihood of solids accumulating and decaying, thereby reducing the likelihood of objectionable odors. Both air systems 9, 10 may additionally contribute to maintaining and cleaning passageways in the radicalized resin fiber media and reducing the likelihood of weight overload on the shaft of rotating biological processor contactor assembly 102.

At least one BPP tank 200 and any other second stage biological processors engaged in sewage and wastewater treatment for a specific application, may be downstream of and may receive the outflow from RBP tanks 100a, 100b. BPP tank 200 may include a drain or waste sludge pump for cleaning purposes. BPP tank 200 can further include a plurality of pendant media sheets 210. The appropriate size and quantity of the pendant media sheets 210 may be determined according to computations from known factors for a specific treatment application. Pendant media sheets 210 can facilitate the second stage biological process and can provide a surface for supporting the growth of microorganisms, thereby facilitating the microorganisms to decompose and purify residual contaminants and pollutants contained in the sewage and wastewater. The sewage and wastewater is thus purified while in tank 200.

The microorganisms that are used to seed BPP 200 and, more specifically, pendant media 210 may be, for example, desired naturally occurring Bacillus species bacteria, various rotifers, protozoa and metazoa. Known nutrient activators appropriate for the particular treatment application may be utilized to stimulate growth of microorganisms during initial treatment process startup.

The BPP 200 may be constructed with both tubular fine air bubble diffusers 9 and subsurface air manifold pipes 10. These air devices may be supplied with air generated by at least one blower 11 and may be sized according to computations for a specific treatment application.

The air supplied by at least one blower 11 to tubular fine bubble air diffusers 9 via air pipe 11a and inline air regulator 11b may have multiple functionality. First, the air may provide two equal and simultaneous functions, those being to inoculate the wastewater with oxygen and to mobilize the mixed liquor suspended solids (MLSS) in the BPP tank 200. The rate of air supplied to the fine bubble tubular diffusers 9 can be provided so as to maintain the appropriate dissolved oxygen level in the wastewater in the BPP tank 200. As the fine air bubbles rise from tubular fine air diffusers 9, the wastewater can circulate with turbulent flow, causing the MLSS to mix and churn throughout BPP tank 200 and further causing the sewage and wastewater to come in contact with the microorganisms on pendant media sheets 210. This contact can allow further effluent purification to occur.

The air supplied by at least one blower 11 through air pipe 11a to subsurface air manifold 10 in the BPP tanks 200 may also have dual functionality. First, the air supplied via manifold 10 may facilitate scouring the bottom of the tank. The scouring functionality may be initiated for a desired period of time and at a desired interval, for example, on a four-day interval basis to facilitate resuspension of settled solids. Second, the air supplied via manifold 10 can reduce the likelihood of solids accumulating and decaying, thereby reducing the likelihood of objectionable odors. Both air systems 9, 10, may additionally contribute to ongoing sloughing of excess biofilm from pendant media sheets 210 during the treatment process.

At least one sedimentation tank 14 can facilitate separation of the treated MLSS outflowing from BPP tank 200. The appropriate size for the sedimentation tank 14 can be determined according to computations from known factors for a specific treatment application. The majority of solids inflowing into sedimentation tank 14 can settle to the bottom and may be mechanically directed to a sludge pit or trough. The supernatant liquid can overflow a notched weir and can be directed to the outflow trough for discharge 14a or further treatment, depending on the specific treatment application needs. A portion of the precipitated sludge 14b from sedimentation tank 14 may be pumped out via a return sludge pump 15 and pipe 15a as return activated sludge. The appropriate pumping interval and duration of pumping may be determined according to computations from known factors for a specific treatment application. The return pumping of the precipitated sludge can facilitate resupplying microorganisms to flow adjustment tank 6 for further dispersal of the microorganisms in and through first stage biological processor tanks 100a, 100b and second stage biological processor tank 200. An excess sludge pump 16 may be employed to pump excess precipitated sludge from sedimentation tank 14 and to move the excess sludge to a dewatering device 17. The type of dewatering device may be determined according to the specific treatment application. The sludge cake 17b from dewatering device 17 may be disposed offsite, while the decant 17a may be returned to flow adjustment tank 6.

Turning to FIG. 4, a second exemplary embodiment of a system for sewage and wastewater purification treatment 400 may be disclosed. System 400 can include a general automatic screening device 2 and screening compactor 2a, an equalization basin 3, a flow adjustment tank 6, first stage biological processor tanks, which may be RBP tanks 100a, 100b, with rotary media disk assembly 102, at least one second stage biological processor tank, which may be a BPP tank 200, with stationary pendant media for microbe adherence 210, a sedimentation tank 14, a sludge dewatering device 17, a supernatant filtering device 18, a flow meter device 19, and ultraviolet (UV) disinfection components 20.

The general automatic screening device 2 for removing coarse contaminants can remove suspended solids greater than 5 mm in size from the inflowing sewage and wastewater via an inlet pipe 1. After screening, the effluent can move to equalization basin 3, while the coarse contaminant removed by screening device 2 can be moved to a screening compactor 2a, whereby the captured screenings may be washed and compressed. The decant liquid 2b from screening compactor 2 may be moved to equalization basin 3 while the compacted screenings 2c can be disposed offsite.

The equalization basin 3 is where the influent may be temporarily staged to allow the varying inflow rates to intermix. Such influent blending facilitates increasing the overall wastewater uniformity, quality and treatment efficiency. Equalization basin 3 can include an air distribution pipe 4 and an air supply pipe 11a which may be pressurized by air supplied by at least one blower 11, via an air pressure regulator 11b disposed inline at each installed air supply pipe 11a so as to appropriately regulate the necessary air delivery rate. The appropriate airflow rate per minute and per unit volume can be computed for each specific treatment application. Injecting air into equalization basin 3 can facilitate reducing the likelihood of the stratification of suspended solids which may result in surface caking or solids deposition, as well as reducing the likelihood of putrefaction occurring.

A raw water feed pump 5 may be provided to transfer the influent from equalization tank 3 to flow adjustment tank 6. Flow adjustment tank 6 may be provided to distribute the sewage and wastewater such that the influent flows uniformly into each RBP tank 100a, 100b or similarly to all and any first stage biological processors engaged in the sewage and wastewater treatment process. The appropriate sizes of RBP tanks 100a, 100b may be determined according to computations from known factors for a specific treatment application. Each RBP tank 100a, 100b may include a bottom drain, sludge pump, or access port for cleaning. Each RBP tank 100a, 100b can further include a rotating biological processor contactor assembly 102. The rotating biological processor contactor assembly 102 can provide a first stage host medium, and can therefore include a plurality of media disks. In some exemplary embodiments, the rotating biological processor contactor assembly 102 can include any desired amount of disks, for example between 10 disks and 30 disks, which can provide a surface for supporting the growth of microorganisms, and facilitate the microorganisms to decompose and purify contaminants and pollutants contained in the sewage and wastewater that inflows from flow adjustment tank 6. The microorganisms that are used to seed the RBP tank 100a, 100b and more specifically the rotating biological processor contactor assembly 102 can be, for example, desired naturally occurring Bacillus species bacteria, various rotifers, protozoa and metazoa. Known nutrient activators appropriate for the particular treatment application may be utilized to stimulate growth of microorganisms during initial treatment process startup.

The RBP tanks 100a, 100b may include fine air bubble tubular diffusers 9 and subsurface air manifold pipes 10. The air devices 9, 10 may be supplied with air generated by at least one blower 11 and may be sized according to computations for a specific treatment application.

The air supplied by at least one blower 11 to fine air bubble tubular diffusers 9 via air regulator 11b and air pipe 11a in the RBP tanks 100a, 100b may have dual functionality. First, the air supplied via diffusers 9 can provide a supplemental air supply to facilitate maintaining appropriate dissolved oxygen levels in process tanks 100a, 100b. Furthermore, the air supplied via diffusers 9 can facilitate dislodging and sloughing off excess or old biomass from the biofilm layer on rotating biological processor contactor assembly 102.

Likewise, the air supplied by at least one blower 11 to subsurface air manifold 10 in the RBP tanks 100a, 100b may have dual functionality. First, the air supplied via manifold 10 may facilitate scouring the bottom of the tank. The scouring functionality may be initiated for a desired period of time and at a desired interval, for example, on a bidaily basis to facilitate resuspension of settled solids. Second, the air supplied via manifold 10 can reduce the likelihood of solids accumulating and decaying, thereby reducing the likelihood of objectionable odors. Both air systems 9, 10 may additionally contribute to maintaining and cleaning passageways in the radicalized resin fiber media and reducing the likelihood of weight overload on the shaft of rotating biological processor contactor assembly 102.

At least one BPP tank 200 and any other second stage biological processors engaged in sewage and wastewater treatment for a specific application, may be downstream of and may receive the outflow from RBP tanks 100a, 100b.

The at least one BPP tank 200 may include a drain or waste sludge pump for cleaning purposes. The BPP tank 200 can further include a plurality of pendant media sheets 210. The appropriate size and quantity of the pendant media sheets 210 may be determined according to computations from known factors for a specific treatment application. Pendant media sheets 210 can facilitate the second stage biological process and can provide a surface for supporting the growth of microorganisms, thereby facilitating the microorganisms to decompose and purify residual contaminants and pollutants contained in the sewage and wastewater. The sewage and wastewater is thus purified while in tank 200.

The microorganisms that are used to seed BPP 200 and more specifically pendant media 210 may be, for example, desired naturally occurring Bacillus species bacteria, various rotifers, protozoa and metazoa. Known nutrient activators appropriate for the particular treatment application may be utilized to stimulate growth of microorganisms during initial treatment process startup.

The at least one BPP tank 200 may be constructed with both tubular fine air bubble diffusers 9 and subsurface air manifold pipes 10. These air devices may be supplied with air generated by at least one blower 11 and may be sized according to computations for a specific treatment application.

The air supplied by at least one blower 11 to tubular fine bubble air diffusers 9 via air pipe 11a and inline air regulator 11b may have multiple functionality. First, the air may provide two equal and simultaneous functions, those being to inoculate the wastewater with oxygen and to mobilize the MLSS in the biological processor tank 200. The rate of air supplied to the fine bubble tubular diffusers 9 can be provided so as to maintain the appropriate dissolved oxygen level in the wastewater in the processor tank 200. As the fine air bubbles rise from tubular fine air diffusers 9, the wastewater can circulate with turbulent flow, causing the MLSS to mix and churn throughout the BPP tank 200 and further causing the sewage and wastewater to come in contact with the microorganisms on pendant media sheets 210. This contact can allow further effluent purification to occur.

The air supplied by at least one blower 11 through air pipe 11a to bottom air manifold 10 in the BPP tanks 200 may also have dual functionality. First, the air supplied via manifold 10 may facilitate scouring the bottom of the tank. The scouring functionality may be initiated for a desired period of time and at a desired interval, for example, on a four-day interval basis to facilitate resuspension of settled solids. Second, the air supplied via manifold 10 can reduce the likelihood of solids accumulating and decaying, thereby reducing the likelihood of objectionable odors. Both air systems 9, 10, may additionally contribute to ongoing sloughing of excess biofilm from pendant media sheets 210 during the treatment process.

At least one sedimentation tank 14 can facilitate separation of the treated MLSS outflowing from BPP tank 200. The appropriate size for the sedimentation tank 14 can be determined according to computations from known factors for a specific treatment application. If desired for a specific treatment application, further purification of treated sewage and wastewater out flowing from sedimentation tank 14 can be achieved by a filtration device 18. The appropriate type, kind and capability of filtration device 18 may be determined by computation for a specific treatment application, and filtration device 18 may be a filtering device known in the art.

Filtration device 18, disposed between sedimentation tank 14 and UV disinfection units 20 can facilitate removing any residual very fine suspended solids so as to achieve a supernatant reading of approximately two nephelometric turbidity units (NTU). Filtered solids 18a removed by filtration device 18 can then be moved to dewatering device 17, while the supernatant filtrate 18b may be moved to flow meter 19 and subsequently to UV light units 20 for disinfection.

UV light units 20 may be configured such that the supernatant filtrate 18b inflows to a series of at least two UV light units, wherein supernatant filtrate 18b may be disinfected. Disinfection of supernatant filtrate 18b by the UV light units can involve the elimination of any living organism in the supernatant filtrate. Redundant UV light units 20 may be provided so as to accommodate servicing and lamp replacement without sacrificing treatment and disinfection efficacy, as well as to satisfy regulatory standards for process redundancy, performance consistency, and capability. To this end, a plurality of parallel pathways 21a, 21b for supernatant filtrate flow may be provided. The parallel pathways 21a, 21b may be operated one at a time. Thus, the supernatant filtrate flow may be directed, for example by a valve, through pathway 21a or through pathway 21b. This can allow the inactive pathway to be appropriately cleaned and any necessary components replaced. Furthermore, an additional UV light unit 20 may be provided downstream of both pathway 21a and 21b.

Figure 6A:
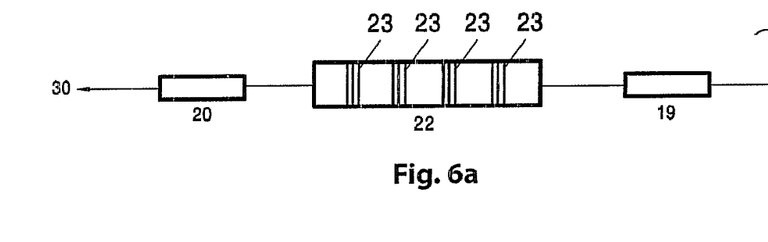
FIG. 6a is a schematic of a portion of a system for wastewater purification with an exemplary embodiment of an ultraviolet disinfection channel.
Figure 6B:
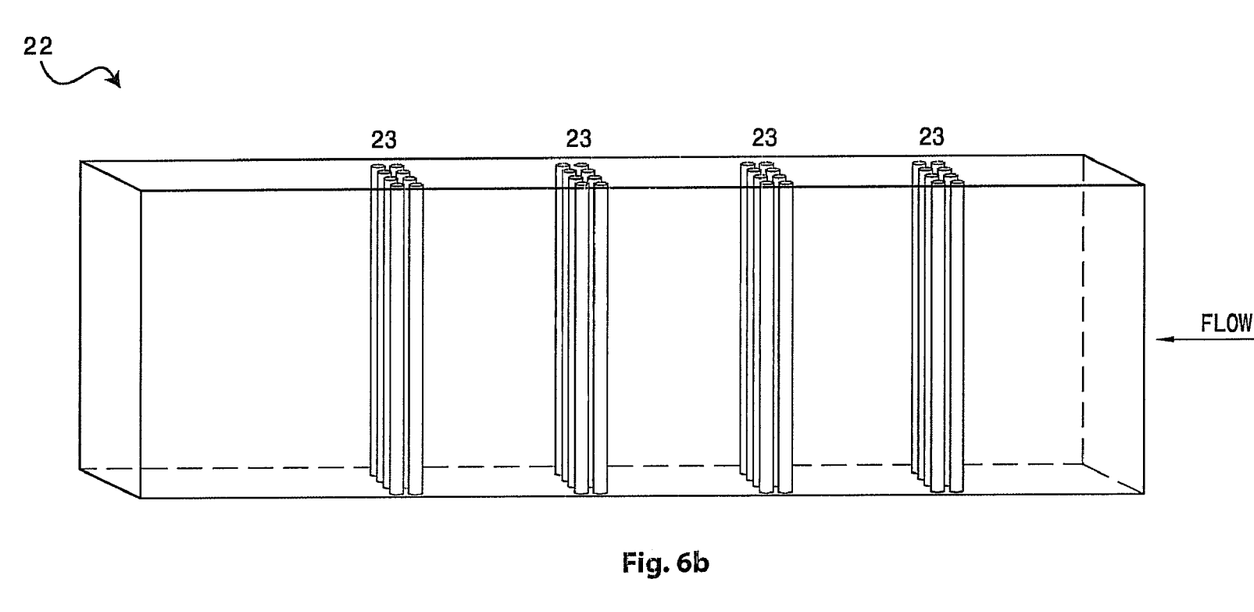
FIG. 6b is a schematic of an exemplary embodiment of an ultraviolet disinfection channel.

In an alternative embodiment, as shown in FIG. 6a, a single UV light disinfection channel 22 may be provided in lieu of light units 20 and channels 21a, 21b. In the single channel 22, as shown in FIG. 6b, multiple independent banks 23 of removable UV lights can be disposed, with the design and specifications of the lights being determined by calculations known in the art. Each light bank 23 may be operated independently of the other light banks 23. Furthermore, only a single light bank 23 may be deactivated at a time, thereby providing a quantity of operating lamps to meet the above-described standards.

In regards to precipitated sludge 14b from sedimentation tank 14, a portion thereof may be pumped via a return sludge pump 15 and pipe 15a as return activated sludge. The appropriate pumping interval and duration of pumping may be determined according to computations from known factors for a specific treatment application. The return pumping of the precipitated sludge can facilitate resupplying microorganisms to flow adjustment tank 6 for further dispersal of the microorganisms in and through RBP tanks 100a, 100b and BPP tank 200. An excess sludge pump 16 may be employed to pump excess precipitated sludge from sedimentation tank 14 and to move the excess sludge to a dewatering device 17. The type of dewatering device may be determined according to the specific treatment application. The sludge cake 17b from dewatering device 17 may be disposed offsite, while the decant 17a may be returned to flow adjustment tank 6. If required, the UV treated effluent 30 out flowing from UV light units 20 may be discharged to a discharge holding tank for temporary storage for regulatory purposes prior to final discharge.

Turning to FIG. 5, a third exemplary embodiment of a system for sewage and wastewater purification treatment 500 may be disclosed. System 500 may be adapted for decomposing and purifying high strength (biochemical oxygen demand of 2,500-10,000 mg/l) sewage and wastewater. System 500 may include a general automatic screening device 2 and screening compactor 2a, an equalization basin 3, a flow adjustment tank 6, a first set of first stage biological processor tanks, which may be RBP tanks 100a, 100b, 100c, with rotary media disk assembly 102, at least one second set of first stage biological processor tanks, which may be RBP tanks 100d, 100e, with rotary media disk assembly 102, at least one second stage biological processor tank, which may be a BPP tank 200, with stationary pendant media for microbe adherence 210, a sedimentation tank 14, a sludge dewatering device 17, a supernatant filtering device 18, a flow meter device 19, and UV disinfection components 20.

The general automatic screening device 2 for removing coarse contaminants can remove suspended solids greater than 5 mm in size from the inflowing sewage and wastewater via an inlet pipe 1. After screening, the effluent can move to equalization basin 3, while the coarse contaminant removed by screening device 2 can be moved to a screening compactor 2a, whereby the captured screenings may be washed and compressed. The decant liquid 2b from screening compactor 2 may be moved to equalization basin 3 while the compacted screenings 2c can be disposed offsite.

The equalization basin 3 is where the influent may be temporarily staged to allow the varying inflow rates to intermix. Such influent blending facilitates increasing the overall wastewater uniformity, quality and treatment efficiency. Equalization basin 3 can include an air distribution pipe 4 and an air supply pipe 11a which may be pressurized by air supplied by at least one blower 11, via an air pressure regulator 11b disposed inline at each installed air supply pipe 11a so as to appropriately regulate the necessary air delivery rate. The appropriate airflow rate per minute and per unit volume can be computed for each specific treatment application. Injecting air into equalization basin 3 can facilitate reducing the likelihood of the stratification of suspended solids which may result in surface caking or solids deposition, as well as reducing the likelihood of putrefaction occurring.

A raw water feed pump 5 may be provided to transfer the influent from equalization tank 3 to flow adjustment tank 6. Flow adjustment tank 6 may be provided to distribute the sewage and wastewater such that the influent flows uniformly into each RBP tank 100a, 100b or similarly to all and any first stage biological processors engaged in the sewage and wastewater treatment process. The flow to the at least one second set of RBP tanks 100d, 100e may be the combined outflows of tanks 100a, 100b, 100c, which can then be equally divided between tanks 100d, 100e, and any further tanks. The appropriate sizes of RBP tanks 100a, 100b, 100c, 100d, 100e may be determined according to computations from known factors for a specific treatment application. Each tank may include a bottom drain, sludge pump, or access port for cleaning. Each RBP tank 100a, 100b 100c, 100d, 100e can further include a rotating biological processor contactor assembly 102. The rotating biological processor contactor 102 can provide a first stage host medium, and can therefore include a plurality of media disks. In some exemplary embodiments, the rotating biological processor contactor assembly 102 can include any desired amount of disks, for example between 10 disks and 30 disks, which can provide a surface for supporting the growth of microorganisms, and facilitate the microorganisms to decompose and purify contaminants and pollutants contained in the sewage and wastewater, further purifying it in the RBP tanks 100d, 100e. The microorganisms that are used to seed the RBP tanks 100a, 100b, 100c, 100d, 100e and more specifically the rotating biological processor contactor assembly 102 can be, for example, desired naturally occurring Bacillus species bacteria, various rotifers, protozoa and metazoa. Known nutrient activators appropriate for the particular treatment application may be utilized to stimulate growth of microorganisms during initial treatment process startup.

The RBP tanks 100a, 100b, 100c, 100d, 100e may include fine air bubble tubular diffusers 9 and bottom air manifold pipes 10. The air devices 9, 10 may be supplied with air generated by at least one blower 11 and may be sized according to computations for a specific treatment application.

The air supplied by at least one blower 11 to fine air bubble tubular diffusers 9 via air regulator 11b and air pipe 11a in the RBP tanks 100a, 100b, 100c, 100d, 100e may have dual functionality. First, the air supplied via diffusers 9 can provide a supplemental air supply to facilitate maintaining appropriate dissolved oxygen levels in RBP tanks 100a, 100b, 100c, 100d, 100e. Furthermore, the air supplied via diffusers 9 can facilitate dislodging and sloughing off excess or old biomass from the biofilm layer on rotating biological processor contactor assembly 102.

Likewise, the air supplied by at least one blower 11 to subsurface air manifold 10 in the RBP tanks 100a, 100b, 100c, 100d, 100e may have dual functionality. First, the air supplied via manifold 10 may facilitate scouring the bottom of the tank. The scouring functionality may be initiated for a desired period of time and at a desired interval, for example, on a bidaily basis to facilitate resuspension of settled solids. Second, the air supplied via manifold 10 can reduce the likelihood of solids accumulating and decaying, thereby reducing the likelihood of objectionable odors. Both air systems 9, 10 may additionally contribute to maintaining and cleaning passageways in the radicalized resin fiber media and reducing the likelihood of weight overload on the shaft of rotating biological processor contactor assembly 102.

At least one BPP tank 200 and any other second stage biological processors engaged in sewage and wastewater treatment for a specific application, may be downstream of and may receive the outflow from the at least one second set of RBP tanks 100d, 100e, which in turn receives their treated effluent from first set of RBP tanks 100a, 100b, 100c.

The at least one BPP tank 200 may include a drain or waste sludge pump for cleaning purposes. BPP tank 200 can further include a plurality of pendant media sheets 210. The appropriate size and quantity of the pendant media sheets 210 may be determined according to computations from known factors for a specific treatment application. Pendant media sheets 210 can facilitate the second stage biological process and can provide a surface for supporting the growth of microorganisms, thereby facilitating the microorganisms to decompose and purify residual contaminants and pollutants contained in the sewage and wastewater. The sewage and wastewater is thus purified while in BPP tank 200.

The microorganisms that are used to seed BPP tank 200 and more specifically pendant media 210 may be, for example, desired naturally occurring Bacillus species bacteria, various rotifers, protozoa and metazoa. Known nutrient activators appropriate for the particular treatment application may be utilized to stimulate growth of microorganisms during initial treatment process startup.

The at least one BPP tank 200 may be constructed with both tubular fine air bubble diffusers 9 and subsurface air manifold pipes 10. These air devices may be supplied with air generated by at least one blower 11 and may be sized according to computations for a specific treatment application.

The air supplied by at least one blower 11 to tubular fine bubble air diffusers 9 via air pipe 11a and inline air regulator 11b may have multiple functionality. First, the air may provide two equal and simultaneous functions, those being to inoculate the wastewater with oxygen and to mobilize the MLSS in the BPP tank 200. The rate of air supplied to the fine bubble tubular diffusers 9 can be provided so as to maintain the appropriate dissolved oxygen level in the wastewater in the BPP tank 200. As the fine air bubbles rise from tubular fine air diffusers 9, the wastewater can circulate with turbulent flow, causing the MLSS to mix and churn throughout the BPP tank 200 and further causing the sewage and wastewater to come in contact with the microorganisms on pendant media sheets 210. This contact can allow further effluent purification to occur.

The air supplied by at least one blower 11 through air pipe 11a to subsurface air manifold 10 in the BPP tanks 200 may also have dual functionality. First, the air supplied via manifold 10 may facilitate scouring the bottom of the tank. The scouring functionality may be initiated for a desired period of time and at a desired interval, for example, on a four-day interval basis to facilitate resuspension of settled solids. Second, the air supplied via manifold 10 can reduce the likelihood of solids accumulating and decaying, thereby reducing the likelihood of objectionable odors. Both air systems 9, 10, may additionally contribute to ongoing sloughing of excess biofilm from pendant media sheets 210 during the treatment process.

At least one sedimentation tank 14 can facilitate separation of the treated MLSS outflowing from BPP tank 200. The appropriate size for the sedimentation tank 14 can be determined according to computations from known factors for a specific treatment application. If desired for a specific treatment application, further purification of treated sewage and wastewater out flowing from sedimentation tank 14 can be achieved by a filtration device 18. The appropriate type, kind and capability of filtration device 18 may be determined by computation for a specific treatment application, and filtration device 18 may be a filtering device known in the art.

Filtration device 18, disposed between sedimentation tank 14 and UV disinfection units 20, can facilitate removing any residual very fine suspended solids so as to achieve a supernatant reading of approximately two nephelometric turbidity units (NTU). Filtered solids 18a removed by filtration device 18 can then be moved to dewatering device 17, while the supernatant filtrate 18b may be moved to flow meter 19 and subsequently to UV light units 20 for disinfection.

UV light units 20 may be configured such that the supernatant filtrate 18b inflows to a series of at least two UV light units, wherein supernatant filtrate 18b may be disinfected. Disinfection of supernatant filtrate 18b by the UV light units can involve the elimination of any living organism in the supernatant filtrate. Redundant UV light units 20 may be provided so as to accommodate servicing and lamp replacement without sacrificing treatment and disinfection efficacy, as well as to satisfy regulatory standards for process redundancy, performance consistency, and capability. To this end, a plurality of parallel pathways 21a, 21b for supernatant filtrate flow may be provided. The parallel pathways 21a, 21b may be operated one at a time. Thus, the supernatant filtrate flow may be directed, for example by a valve, through pathway 21a or through pathway 21b. This can allow the inactive pathway to be appropriately cleaned and any necessary components replaced. Furthermore, an additional UV light unit 20 may be provided downstream of both pathway 21a and 21b.

In an alternative embodiment, as shown in FIG. 6a, a single UV light disinfection channel 22 may be provided in lieu of UV light units 20 and channels 21a, 21b. In the single channel 22, as shown in FIG. 6b, multiple independent banks 23 of removable UV lights can be disposed, with the design and specifications of the lights being determined by calculations known in the art. Each light bank 23 may be operated independently of the other light banks 23. Furthermore, only a single light bank 23 may be deactivated at a time, thereby providing a quantity of operating lamps to meet the above-described standards.

In regards to precipitated sludge 14b from sedimentation tank 14, a portion thereof may be pumped via a return sludge pump 15 and pipe 15a as return activated sludge. The appropriate pumping interval and duration of pumping may be determined according to computations from known factors for a specific treatment application. The return pumping of the precipitated sludge can facilitate resupplying microorganisms to flow adjustment tank 6 for further dispersal of the microorganisms in and through RBP tanks 100a, 100b and BPP tank 200. An excess sludge pump 16 may be employed to pump excess precipitated sludge from sedimentation tank 14 and to move the excess sludge to a dewatering device 17. The type of dewatering device may be determined according to the specific treatment application. The sludge cake 17b from dewatering device 17 may be disposed offsite, while the decant 17a may be returned to flow adjustment tank 6. If required, the UV treated effluent 30 out flowing from UV light units 20 may be discharged to a discharge holding tank for temporary storage for regulatory purposes prior to final discharge.

If necessary, while employing any of the embodiments of system 300, 400, 500, any known intermediate filtration methods may be employed between the general automatic screening device and the flow adjustment tank to further remove fine suspended solids of >5 mm. Such filtration devices can facilitate removing additional fine suspended solids and can provide increased treatment efficiency and higher quality.

Furthermore, embodiments disclosed herein can facilitate a substantial reduction or offset of energy usage between the various treatment modes, which are the RBP 100, BPP 200 and sedimentation tank 14. Once the influent has been pumped to the RBP 100, the treated effluent can then flow by gravity to the BPP 200, and can subsequently flow by gravity to the sedimentation tank 14. The elimination of pumping requirements between various stages of treatment can reduce power consumption as well as initial capital and ongoing operational cost.

Figure 7:
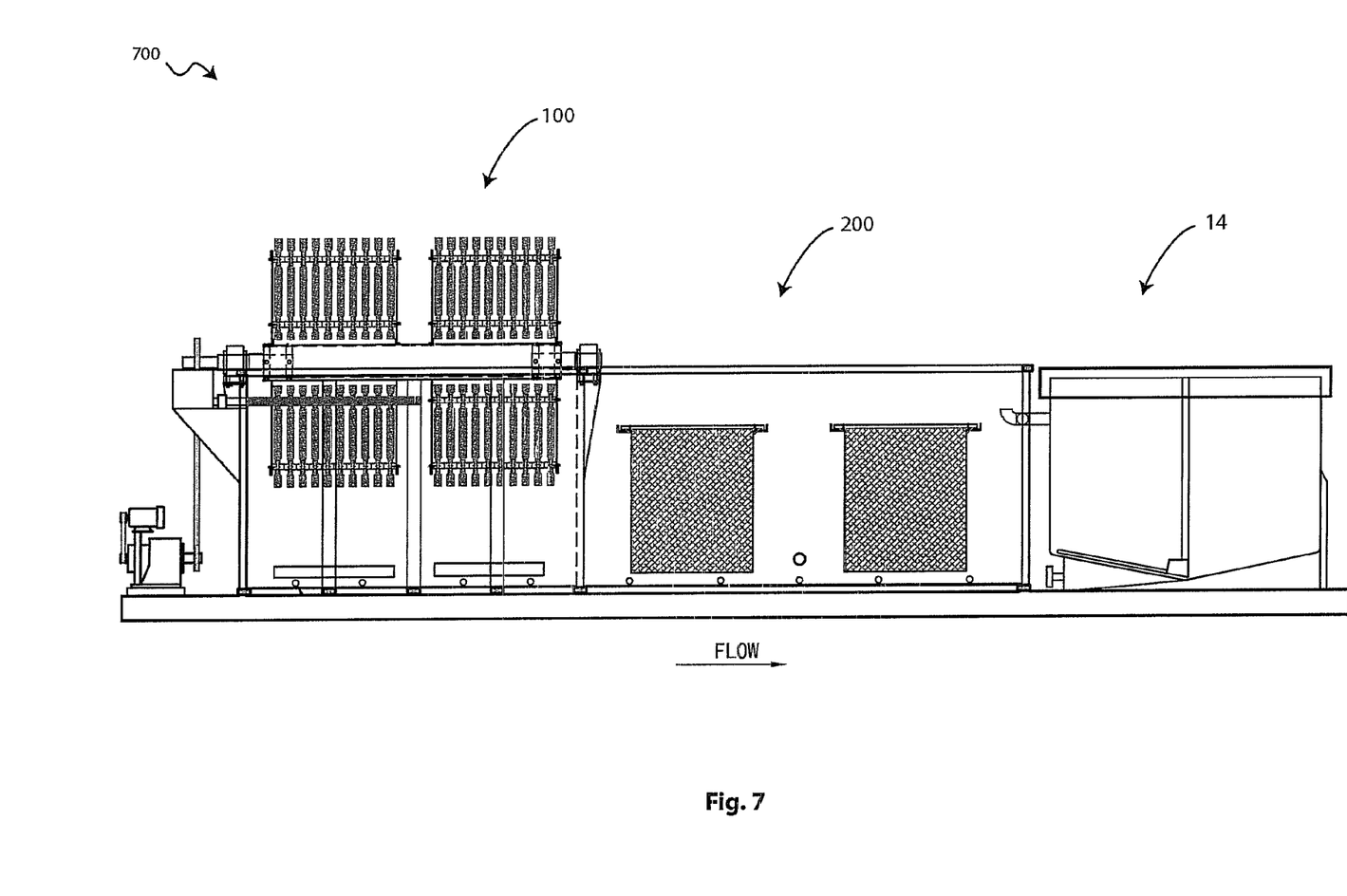
FIG. 7 is a schematic side view of an exemplary embodiment of an integrated processing unit.

In some exemplary embodiments, as shown in FIG. 7, the RBP 100, BPP 200, and sedimentation tank 14 may be provided as an integrated processing unit 700. Integrated processing unit 700 may be used with any of the embodiments of system 300, 400, 500, and can facilitate providing compact integrated treatment solutions according to the embodiments described herein.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An apparatus for wastewater treatment, comprising:
a containment basin for receiving a liquid to be treated, the liquid having a direction of flow;
a plurality of pendant sheets for supporting the growth of microorganisms, disposed within the basin and in contact with the liquid;
at least one fine bubble diffuser disposed within the basin and oriented perpendicularly to the pendant sheets; and
at least one subsurface air manifold disposed within the basin and adapted to emit coarse air bubbles;
wherein the pendant sheets are oriented parallel to the direction of flow of the liquid.

2. The apparatus of claim 1, wherein each of the plurality of pendant sheets further comprises:
a radicalized resin fiber network media; and
a thixed, prepromoted unsaturated wax orthopolyester resin.

3. The apparatus of claim 1, wherein each of the plurality of pendant sheets has a thickness of about 25 millimeters.

4. The apparatus of claim 1, wherein each of the plurality of pendant sheets is suspended within the basin in a vertical orientation.

5. The apparatus of claim 1, wherein the liquid is effluent from a rotating biological processor.

6. The apparatus of claim 1, wherein flow is imparted to the liquid by gravity.

7. A system for wastewater treatment, comprising:
at least one rotating biological processor; and
at least one pendant biological processor disposed downstream of the at least one rotating biological processor;
wherein the at least one pendant biological processor further comprises a containment basin for receiving wastewater, the wastewater having a direction of flow;
a plurality of pendant sheets for supporting the growth of microorganisms, disposed within the basin and in contact with the wastewater, the pendant sheets being oriented parallel to the direction of flow of the wastewater;
at least one fine bubble diffuser disposed within the basin and oriented perpendicularly to the pendant sheets; and
at least one subsurface air manifold disposed within the basin and adapted to emit coarse air bubbles.

8. The system of claim 7, wherein each of the plurality of pendant sheets comprises:
a radicalized resin fiber network media; and
a thixed, prepromoted unsaturated wax orthopolyester resin.

9. The system of claim 7, wherein the at least one rotating biological processor includes a plurality of media disks, each of the plurality of media disks comprising a radicalized resin fiber network media and a thixed, prepromoted unsaturated wax orthopolyester resin.

10. The system of claim 7, further comprising at least two rotating biological processors arranged in parallel.

11. The system of claim 7, further comprising at least one ultraviolet disinfection unit disposed downstream of the at least one pendant biological processor.

12. The system of claim 7, wherein the wastewater flows from the rotating biological processor to the pendant biological processor due to gravity.

13. The system of claim 7, wherein each of the at least one rotating biological processor and the at least one pendant biological processor include at least one fine bubble diffuser and at least one subsurface air manifold.

14. The system of claim 7, further comprising at least two rotating biological processors arranged in series.

15. A process for wastewater treatment, comprising:
flowing wastewater into a containment basin, the basin having a plurality of pendant sheets suspended therein;
flowing the wastewater in a direction parallel to the plurality of pendant sheets;
activating, at predetermined intervals, at least one of a fine bubble diffuser disposed within the basin and a subsurface air manifold disposed within the basin; and
flowing the wastewater out of the basin;
wherein the pendant sheets support the growth of microorganisms for treating the wastewater;
the at least one fine bubble diffuser is oriented perpendicularly to the pendant sheets; and
the at least one subsurface air manifold is adapted to emit coarse air bubbles.

16. The process of claim 15, further comprising:
flowing the wastewater into the basin from at least one rotating biological processor.

17. The process of claim 15, further comprising:
increasing floc levels without the use of polymer coagulants; and increasing settleability rates in the basin without the use of polymer coagulants.

18. The process of claim 15, further comprising:
flowing the wastewater from the basin into a sedimentation tank;
precipitating a sludge from the wastewater in the sedimentation tank; and
utilizing a portion of the sludge to resupply microorganisms to the basin.

19. The process of claim 15, further comprising:
flowing the wastewater through at least one ultraviolet disinfection unit.

* * * * *